US011006314B2

(12) United States Patent
Dowlatkhah et al.

(10) Patent No.: US 11,006,314 B2
(45) Date of Patent: May 11, 2021

(54) DYNAMIC ACCESS SLICE POOLING AND SOFTWARE DEFINED NETWORK CONTROLLED CAPABILITIES

(71) Applicant: AT&T Intellectual Property I, L.P., Atlanta, GA (US)

(72) Inventors: Sangar Dowlatkhah, Alpharetta, GA (US); Venson Shaw, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/867,843

(22) Filed: May 6, 2020

(65) Prior Publication Data

US 2020/0267592 A1    Aug. 20, 2020

Related U.S. Application Data

(63) Continuation of application No. 15/829,777, filed on Dec. 1, 2017, now Pat. No. 10,779,186.

(51) Int. Cl.
*H04L 12/851* (2013.01)
*H04W 48/18* (2009.01)
(Continued)

(52) U.S. Cl.
CPC ....... *H04W 28/0268* (2013.01); *H04L 45/306* (2013.01); *H04L 47/2425* (2013.01); *H04W 88/06* (2013.01)

(58) Field of Classification Search
CPC ............. H04W 28/0268; H04W 48/18; H04W 47/2433; H04W 8/186; H04W 8/183
See application file for complete search history.

(56) References Cited

U.S. PATENT DOCUMENTS 9,319,925 B2    4/2016 Liang
9,332,486 B2    5/2016 Scherzer
(Continued)

FOREIGN PATENT DOCUMENTS

CN    104584623 A    4/2015
WO    2012092802 A1    7/2012
(Continued)

OTHER PUBLICATIONS

Non-Final Office Action received for U.S. Appl. No. 15/829,777 dated Dec. 10, 2018, 20 pages.
(Continued)

*Primary Examiner* — Diane L Lo
*Assistant Examiner* — Abusayeed M Haque
(74) *Attorney, Agent, or Firm* — Amin, Turocy & Watson, LLP

(57) ABSTRACT

Various embodiments disclosed herein provide for a dynamic access slice pooling system with software defined network (SDN) controlled capabilities in a 5G wireless communications system. A radio access network device can have one or more slices instantiated on the device that facilitate various services being requested by user equipment devices. A slice can have one or more virtual network functions that are specialized for particular services. When a user equipment device requests a service, the service can be assigned to a slice based on the type of service being requested. If the type of slice associated with the service is not currently operational, the SDN controller on the radio access network device can instantiate a new slice with the virtual network functions selected for the service being requested.

20 Claims, 10 Drawing Sheets

(51) Int. Cl.
*H04W 28/02* (2009.01)
*H04L 12/725* (2013.01)
*H04W 88/06* (2009.01)

(56) References Cited

U.S. PATENT DOCUMENTS

| | | | |
|---|---|---|---|
| 9,445,334 | B2 | 9/2016 | Tinnakornsrisuphap et al. |
| 9,456,397 | B2 | 9/2016 | Forssell et al. |
| 9,661,546 | B2 | 5/2017 | Johansson et al. |
| 9,742,690 | B2 | 8/2017 | Parikh et al. |
| 9,756,684 | B2 | 9/2017 | Tammisetti |
| 9,788,345 | B2 | 10/2017 | Jeong et al. |
| 2014/0086176 | A1 | 3/2014 | Liu et al. |
| 2016/0150564 | A1 | 5/2016 | Quan et al. |
| 2016/0156422 | A1 | 6/2016 | Lindoff et al. |
| 2016/0212625 | A1 | 7/2016 | Damnjanovic et al. |
| 2016/0345301 | A1 | 11/2016 | Webb et al. |
| 2016/0353465 | A1 | 12/2016 | Vrzic et al. |
| 2017/0086118 | A1 | 3/2017 | Vrzic |
| 2017/0142591 | A1 | 5/2017 | Vrzic |
| 2017/0164349 | A1 | 6/2017 | Zhu et al. |
| 2017/0230871 | A1 | 8/2017 | Rangaswamy et al. |
| 2017/0238362 | A1 | 8/2017 | Karandikar et al. |
| 2017/0289791 | A1 | 10/2017 | Yoo et al. |
| 2018/0070327 | A1 | 3/2018 | Qureshi et al. |
| 2018/0124854 | A1* | 5/2018 | Myhre ................. H04W 76/10 |
| 2018/0183724 | A1 | 6/2018 | Callard et al. |
| 2018/0227958 | A1 | 8/2018 | Xiong et al. |
| 2018/0352501 | A1* | 12/2018 | Zhang ................. H04W 48/14 |
| 2018/0359337 | A1* | 12/2018 | Kodaypak ............. H04L 43/08 |
| 2019/0132707 | A1 | 5/2019 | Prasad |
| 2020/0169951 | A1* | 5/2020 | Cai ...................... H04W 48/18 |
| 2020/0267557 | A1* | 8/2020 | Zhao ................. H04L 41/0896 |
| 2020/0275356 | A1* | 8/2020 | Forsman ............. H04L 41/0803 |

FOREIGN PATENT DOCUMENTS

| | | |
|---|---|---|
| WO | 2016000313 A1 | 1/2016 |
| WO | 2016095992 A1 | 6/2016 |
| WO | 2016141569 A1 | 9/2016 |
| WO | 2017062244 A1 | 4/2017 |
| WO | 2017118489 A1 | 7/2017 |
| WO | 2017135858 A1 | 8/2017 |
| WO | 2017140342 A1 | 8/2017 |
| WO | 2017146793 A1 | 8/2017 |
| WO | 2017152994 A1 | 9/2017 |

OTHER PUBLICATIONS

Non-Final Office Action received for U.S. Appl. No. 15/829,777 dated Aug. 8, 2019, 32 pages.
Notice of Allowance received for U.S. Appl. No. 15/829,777 dated Feb. 7, 2020, 25 pages.
Bangerter, Boyd, et al. "Networks and devices for the 5G era." IEEE Communications Magazine 52.2 (2014): 90-96.
Wang, Cheng-Xiang, et al. "Cellular architecture and key technologies for 5G wireless communication networks." IEEE Communications Magazine 52.2 (2014):122-130.
Bhushan, Naga, et al. "Network densification: the dominant theme for wireless evolution into 5G." IEEE Communications Magazine 52.2 (2014): 82-89.
Rost, Peter, et al. "Cloud technologies for flexible 5G radio access networks." IEEE Communications Magazine 52.5 (2014): 68-76.

* cited by examiner

DYNAMIC ACCESS SLICE POOLING AND SOFTWARE DEFINED NETWORK CONTROLLED CAPABILITIES

RELATED APPLICATION

The subject patent application is a continuation of, and claims priority to, U.S. patent application Ser. No. 15/829,777, filed Dec. 1, 2017, and entitled "DYNAMIC ACCESS SLICE POOLING AND SOFTWARE DEFINED NETWORK CONTROLLED CAPABILITIES," with the entirety of this application being hereby incorporated by reference herein.

TECHNICAL FIELD

The present application relates generally to a field of mobile communication and, more specifically to dynamically providing access slice pooling and software defined network (SDN) controlled capabilities.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
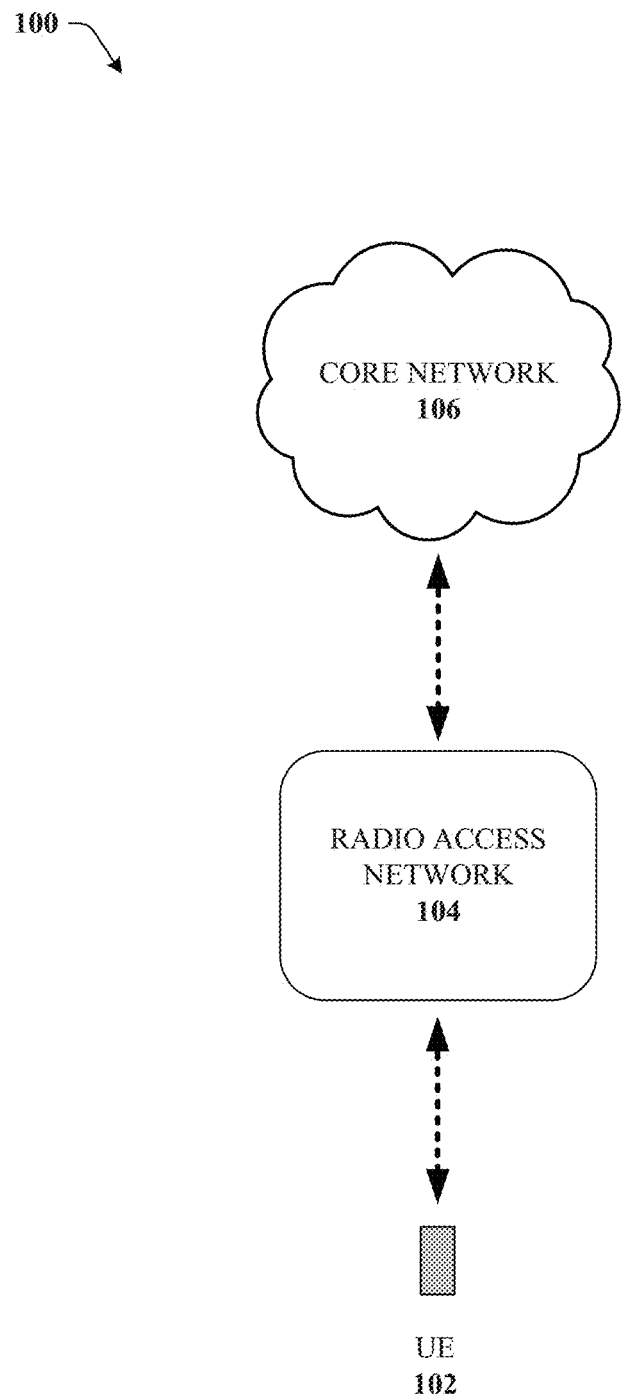
FIG. 1 illustrates an example wireless communication system for dynamically providing access slice pooling in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a dynamic access slice pooling system with SDN controlled capabilities in a 5G wireless communications system. A radio access network device can have one or more slices instantiated on the device that facilitate various services being requested by user equipment devices. A slice can have one or more virtual network functions that are specialized for particular services. When a user equipment device requests a service, the service can be assigned to a slice based on the type of service being requested. If the type of slice associated with the service is not currently operational, the SDN controller on the radio access network device can instantiate a new slice with the virtual network functions selected for the service being requested. In an embodiment, additional slices can also be instantiated or used in response to changing network conditions such as increased demand and etc.

In an embodiment, the access slice pooling system can also be used to facilitate access to a number of different access technologies. As the number of different connectivity types increases, and traffic demand increases, being able to assign and instantiate access slices on various different access networks can enable devices to seamlessly operate across different network platforms and technologies.

The access slice pooling system can also assign different access slices to facilitate different services based on the requirements of the service. For instance, an application on a user equipment device that requires low latency service, can be assigned to an access slice with virtual network functions designed for low latency. To able to tailor the solution to ever increasing type of technology with their disparate requirements, the access network needs to be able to instantiate dedicated and very specific feature for that explicit access technology on demand In most cases, when the service is being used by a subscriber through a one or more access technology, it expected that the network shall take into consideration the type of available access, signal strength, traffic load and other potential variables in order to choose best possible network for that specific service.

On the core network, some of main core capabilities are being instantiated on separate instances within group of dedicated functions called slices. This slices can have specific characteristics intended for the specific service requirements. A dynamic access slice pooling capability to address crucial challenge where any access technology combination can be used to transfer information to the core network efficiently and securely. Heterogeneous network comprises of different type of network elements that can be virtually combined in a number of combination in order to create a perfect slice of network for a specific service infrastructure.

Note that for simplicity we use the radio network node or simply network node is used for gNB. It refers to any type of network node that serves UE and/or connected to other network node or network element or any radio node from where UE receives signal. Examples of hosting layer radio network nodes are Node B, base station (BS), multi-standard radio (MSR) node such as MSR BS, gNB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc. Other types of access point devices can include 6LowPan, Wi-Fi, Range extenders, femtocells, and other enhancing layer devices.

Likewise, for reception we use the term user equipment (UE). It refers to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports are also interchangeably used but carry the same meaning in this disclosure.

In various embodiments, a system can comprise a processor and a memory that stores executable instructions that, when executed by the processor facilitate performance of operations. The operations can comprise receiving a request for a first service from a user equipment associated with a radio access network. The operations can also include selecting a first radio access network slice from a group of active radio access network slices to manage the first service, wherein the first radio access network slice comprises a group of virtual network functions associated with the first service. The operations can also comprise instantiating the first radio access network slice on a device associated with the radio access network.

In another embodiment, method comprises determining, by a device comprising a processor, that a user equipment is requesting initiation of a first network service. The method can also comprise assigning, by the device, a first radio access network slice selected from a group of radio access network slices to manage the first network service, wherein the first radio access network slice comprises a group of virtual network functions associated with the first network service. The method can also comprise facilitating, by the device, transmitting of data processed by the first radio access network slice to a core network device.

In another embodiment machine-readable storage medium, comprising executable instructions that, when executed by a processor of a device, facilitate performance of operations. The operations can comprise receiving a transmission corresponding to a first network service from a user device associated with a radio access network. The operations can also comprise selecting a first radio access network slice from a group of active radio access network slices to manage the first network service, wherein the first radio access network slice comprises a group of virtual network functions associated with the first network service.

The operations can also comprise causing the first radio access network slice to be instantiated on at least one device of the radio access network.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. The mechanical parts can include sensors on a float, tilt monitors, and etc. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), machine to machine, satellite, microwave, laser, Z-Wave, Zigbee and other 802.XX wireless technologies and/or legacy telecommunication technologies.

FIG. 1 illustrates an example embodiment 100 of an access slice pooling system in accordance with various aspects and embodiments of the subject disclosure. A UE device 102 can connect to a mobile network (e.g., core network 106) via radio access network device 104. The radio access network device 104 can have one or more slices instantiated to facilitate the communications with the core network 106. Network slices are form of virtual network architecture that comprise a defined set of virtual network functions designed to facilitate one or more computing purposes. Various slices can be instantiated on the radio access network device 104, each of the network slices to perform a set of operations to facilitate one or more services.

Each access slice comprises an independent set of logical network functions that support the requirements of the particular use case, with the term 'logical' referring to software. Each slice can be optimized to provide the resources and network topology for the specific service and traffic that will use the slice. Functions such as speed, capacity, connectivity and coverage will be allocated to meet the particular demands of each use case, but functional components may also be shared across different network slices.

In an embodiment, radio access network 104 may have several slices instantiated, facilitating communications with the user equipment devices connected to the radio access network 104. When a request for a service is received from UE 102 (e.g., in response to UE 102 initiating a phone call, voice communication, video communication, initiating an application, transferring data, and etc.) one or more network functions on radio access network 104 can assign the service to one of the slices on the radio access network device 104 based on the service being requested. If the slice(s) associated with the service is not currently instantiated, the radio access network device 104 can instantiate the slice to manage or facilitate the service. The radio access network 104 can select the appropriate slice based on one or more characteristics of the service, including the bandwidth requirements, latency requirements, functions required, and other requirements.

In one or more embodiments, different UE devices, subscribers, clients, enterprise customers, may have different requirements regarding security, traffic control, logging, and so different slices can be instantiated based on the requirements. For instance, multiple enterprise customers may operate devices on a mobile network, and when a UE device (e.g., UE device 102) connects to radio access network 104, the core network 106 can determine which customer the UE device 102 is associated with, and assign the services to the appropriate access slice on radio access network 104.

Likewise, UE device 102 may belong to another mobile network, and be roaming on the mobile network associated with radio access network 104. Core network 106 can determine the requirements of the UE device 102 from the home mobile network, and instruct radio access network 104 to instantiate a slice with appropriate virtual network functions.

In an embodiment, the core network 106 can also have one or more service related slices to facilitate the services being requested by the UE 102. SDN controllers on the core network 106 and radio access network 104 can handle routing the service traffic between the relevant access slices and service related slices.

Figure 2:
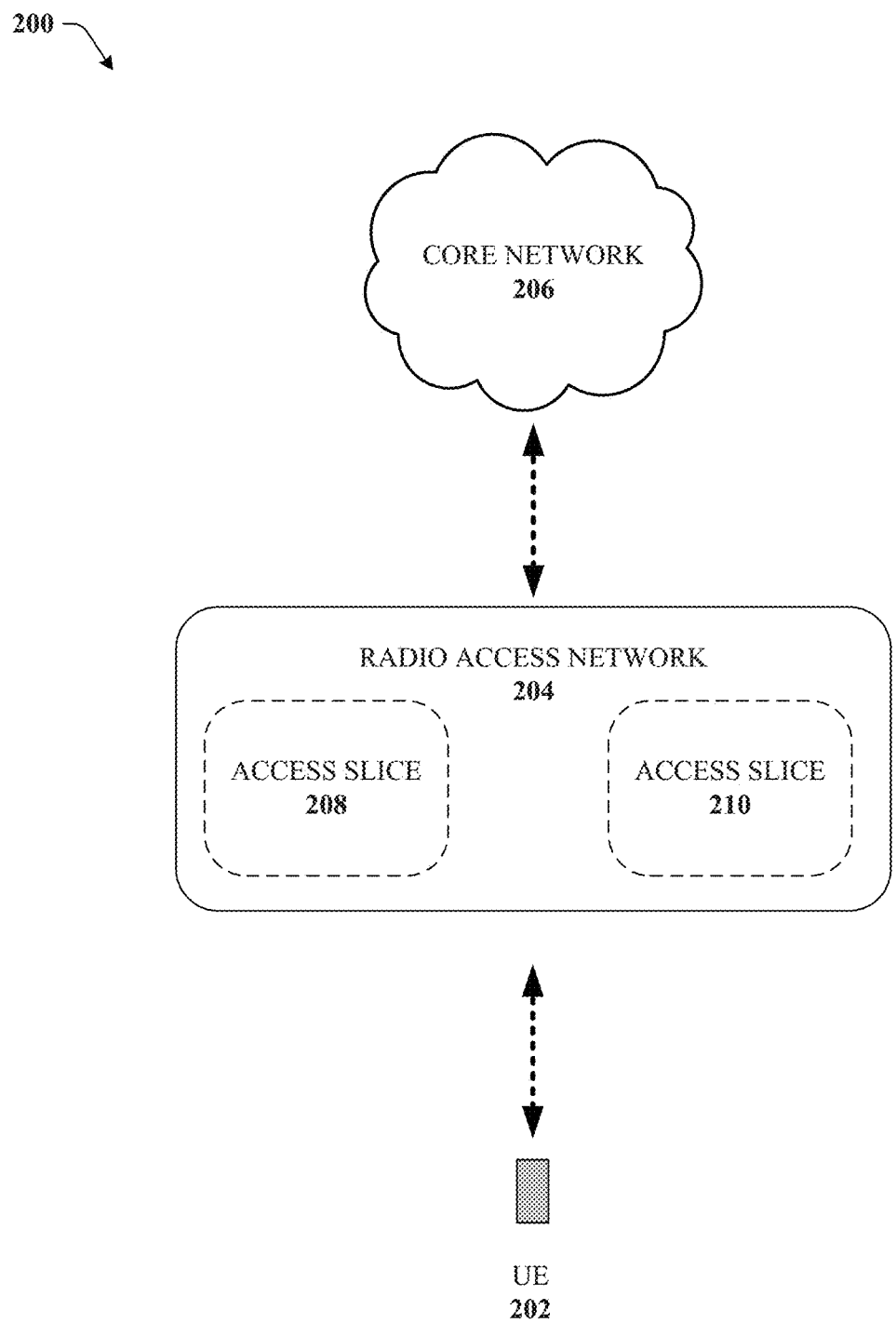
FIG. 2 illustrates an example radio access network that assigns access slices to facilitate communications with a user equipment device in accordance with various aspects and embodiments of the subject disclosure.

Turning now to FIG. 2, illustrated is an example embodiment 200 of a radio access network that assigns access slices to facilitate communications with a user equipment device in accordance with various aspects and embodiments of the subject disclosure.

In the embodiment shown in FIG. 2, radio access network device 204 can have two access slices 208 and 210 instantiated on the device 204. In one or more embodiments, each of the access slices 208 and 210 can be facilitating and/or managing traffic for services being requested by UE 202. For instance, UE 202 could have two applications operational, or an application on UE 202 could be requesting two different services. If the services have different enough requirements, the radio access network 204 can assign the services to respective access slices (e.g., 208 and 210). The access slices 208 and 210 can facilitate communications between the UE 202 and the core network 206 and respective service related slices instantiated on the core network 206.

In an embodiment, the radio access network 204 can assign the service related traffic to the access slices 208 and/or 210 based on the type of service being requested. For example, any service relating to a real-time communication can be assigned to a slice that is designed for low latency services. In other embodiments, the service request can comprise an indicator requesting a particular slice, or a slice with a defined or preferred set of virtual network functions. In yet another embodiment, the radio access network 204 can learn which type of slice would be best for the service. For instance, if the radio access network 204 determines that real time communications, and high speed bandwidth are requirements, the radio access network 204 can design a slice based on the requirements, or instantiate a slice from a set of slices that most closely matches the requirements of the service.

Figure 3:
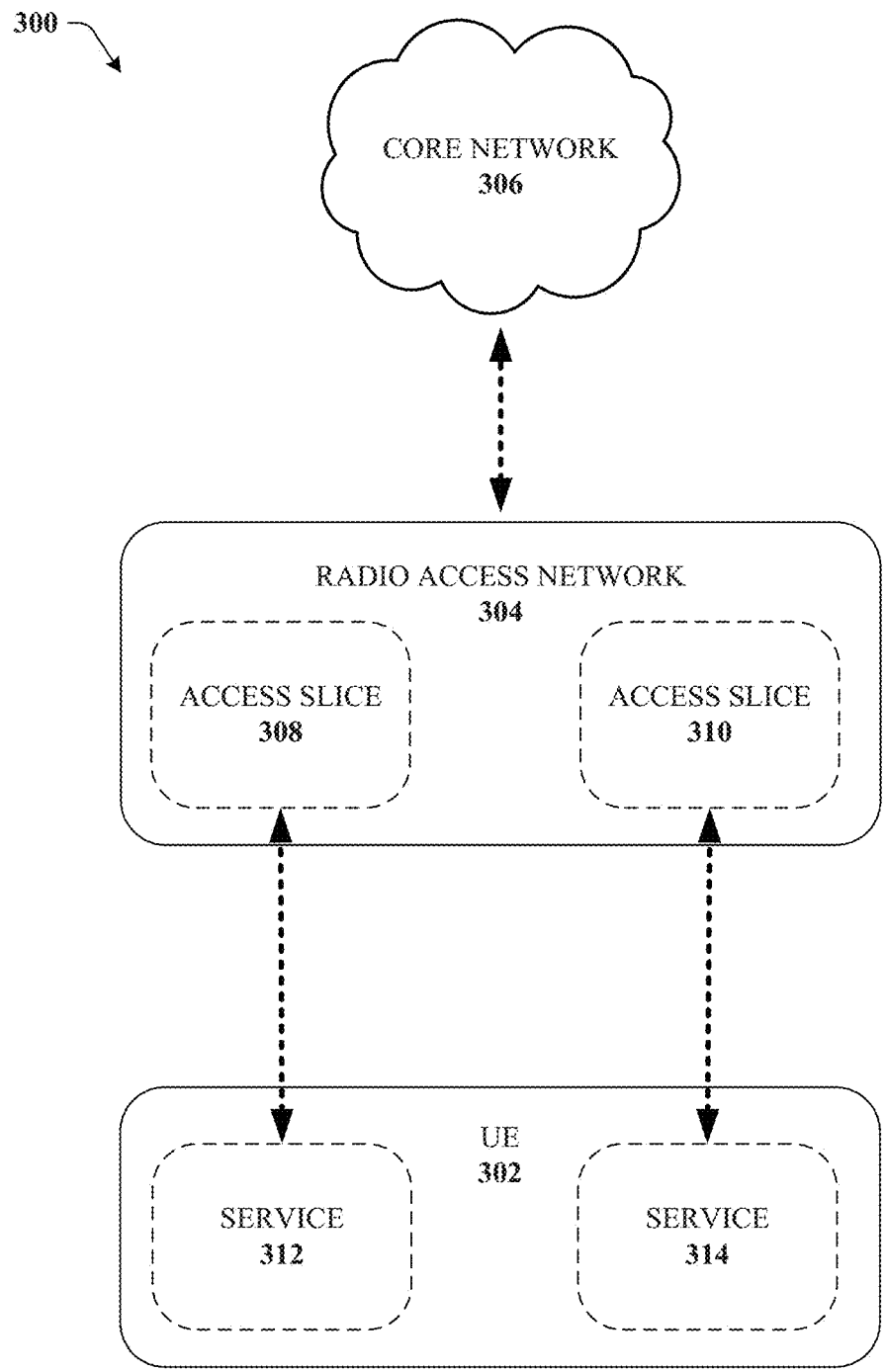
FIG. 3 illustrates an example radio access network that assigns access slices to facilitate communications with a user equipment device based on a service being used by the user equipment device in accordance with various aspects and embodiments of the subject disclosure.

Turning now to FIG. 3, illustrated is an example embodiment 300 of a radio access network that assigns access slices to facilitate communications with a user equipment device based on a service being used by the user equipment device in accordance with various aspects and embodiments of the subject disclosure.

In the embodiment shown in FIG. 3, UE 302 may have a plurality of services (e.g., services 312 and 314) running, and radio access network device 304 can assign different slices (e.g., slices 308 and 310) to facilitate communications between services 312 and 314 and the core network 306. The services 312 can be from disparate applications on the UE 302, or can be associated with the same application.

In an embodiment, radio access network 304 can adjust the resources provided to one or more of access slices 308 and/or 310 depending on the requirements of the services 312 and 314. If service 312 requires additional resources (bandwidth, throughput, latency requirements, etc.) radio access network 304 can adjust the resources provided to access slice 308 accordingly, increasing the size or capabilities of the slice dynamically. If the slices are limited in size, radio access network 304 can even instantiate duplicate slices to provide load balancing for the service 312.

In an embodiment, the access slices 308 and 310 can provide functionality for different aspects of services 312 and 314. For instance, access slice 308 can manage user plane interactions with the user equipment device 302, while access slice 310 can manage control plane interactions with user equipment device 302.

In an embodiment, access slices 308 and/or 310 can be instantiated based on expected need. For instance, if the radio access network 304 predicts that services 312 and/or 314 will be requested by UE 302, radio access network 304 can instantiate access slices 308 and 310 before the requests are received based on the prediction or based on past behavior. This can enable the radio access network 304 to more quickly assign the requested services to the respective access slices.

Figure 4:
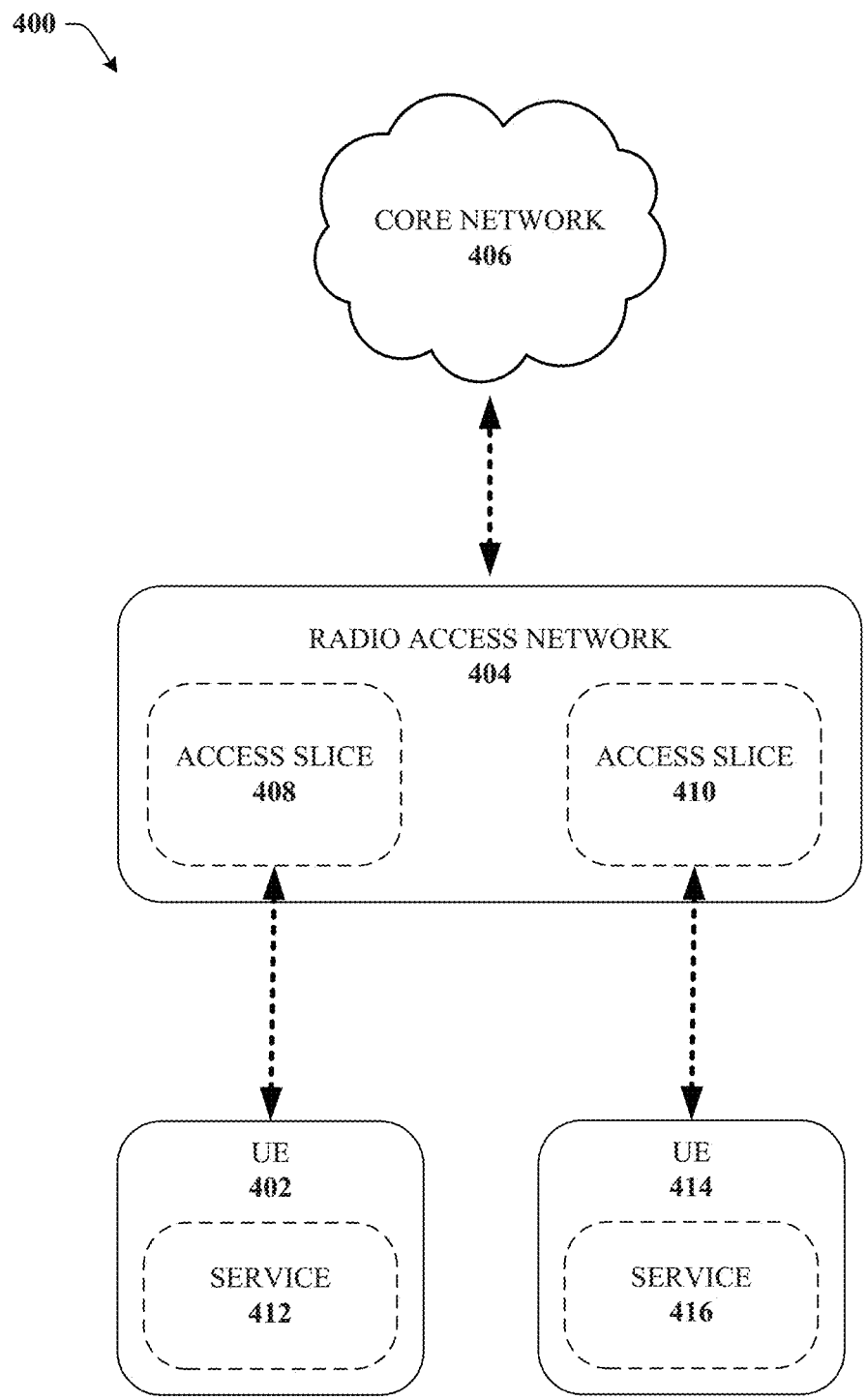
FIG. 4 illustrates an example radio access network that assigns access slices to facilitate communications with a plurality of user equipment devices in accordance with various aspects and embodiments of the subject disclosure.

Turning now to FIG. 4, illustrated is an example embodiment 400 of a radio access network that assigns access slices to facilitate communications with a plurality of user equipment devices in accordance with various aspects and embodiments of the subject disclosure.

In the embodiment shown in FIG. 4, UE 402 and 414 can have services 412 and 416 respectively managed by access slices 408 and 410 on the radio access network 404. The access slices 408 and 410 can facilitate data traffic and processing between services 412 and 416 and the core network 406.

In an embodiment, access slices 408 and/or 410 can be instantiated based on expected need. For instance, if the radio access network 304 predicts that services 412 and/or 414 will be requested by UEs 402 and 414, radio access network 404 can instantiate access slices 408 and 410 before the requests are received based on the prediction or based on past behavior. Radio access network 404 can also instantiate access slices 408 and 410 based on determining which different types of devices are connected to the network (e.g., devices 402 and 414). For instance, the UEs 402 and 414 may have different technologies, or requirements, or can even be associated with subscribers to different levels of service requirements, or mobile networks, and radio access network 404 can instantiate the access slices that have the relevant virtual network functions for the UEs 402 and 414.

Figure 5:
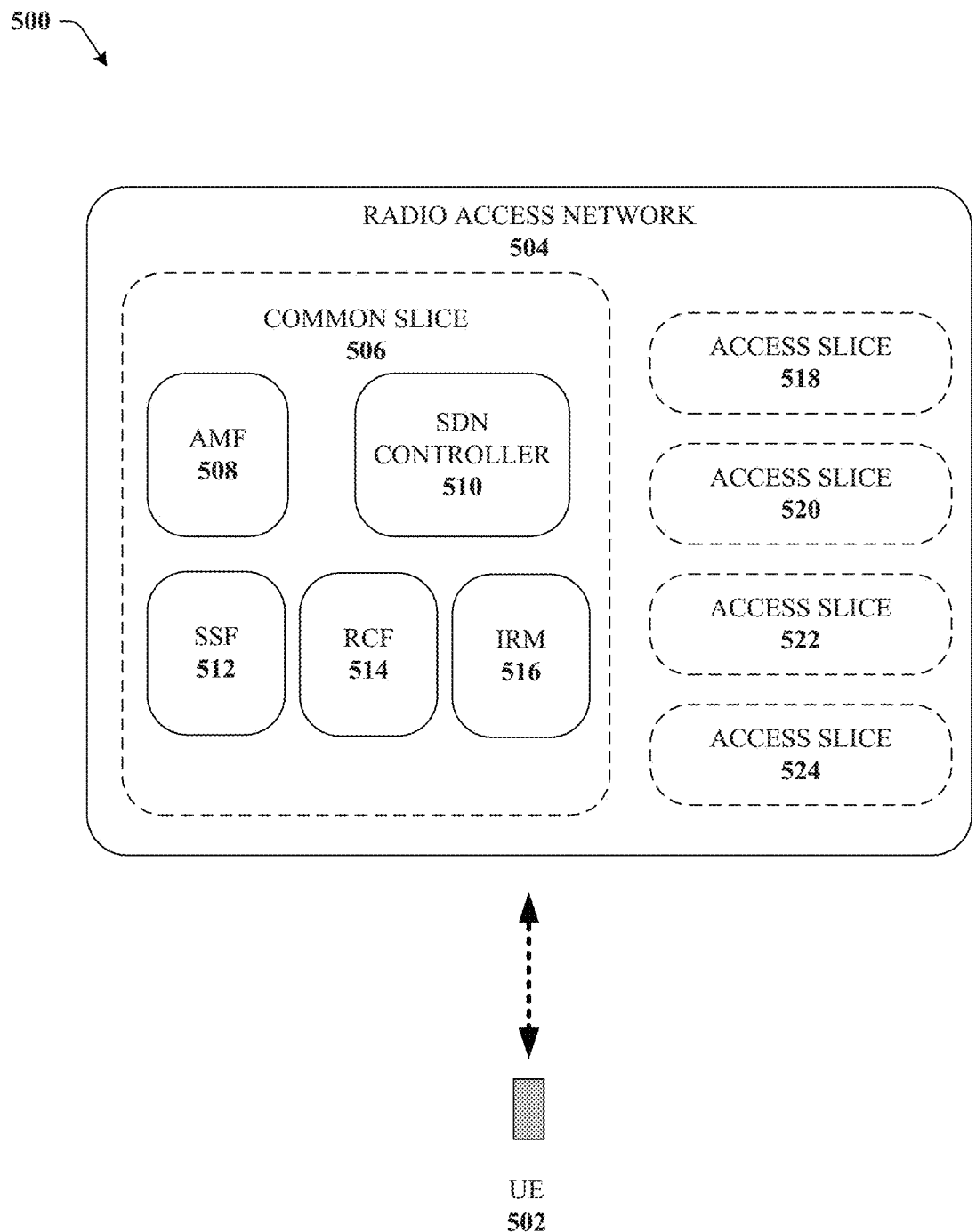
FIG. 5 illustrates an example embodiment of a radio access network in accordance with various aspects and embodiments of the subject disclosure.

Turning now to FIG. 5, illustrated is an example embodiment 500 of a radio access network in accordance with various aspects and embodiments of the subject disclosure. The radio access network 504 can correspond to one or more of radio access networks 104, 204, 304, and/or 404.

Radio access network 504 can comprise a common slice with virtual network functions for facilitating access slice pooling and assignments. The common slice 506 can receive a request for service from a UE 502, and various virtual network functions on common slice 506 can determine information about the UE device 502, the service requested, select an access slice (e.g., access slice 518, 520, 522, and/or 524) to assign the service to, or instantiate a new access slice, as well as facilitate communications between the access slices and the core network.

In an embodiment, the common slice 506 can include an access management function 508, a slice selection function 512, a radio controller function 514, an intelligent resource management function 516, as well as an SDN controller 510. The radio controller function 514 can configure radio devices such as 4G radios, 5G radios, Wi-Fi radios, 6Low-Pan radios, and etc. The access management function 508 can determine which technologies should be prioritized for specific services. For example, 5G technologies can be prioritized for services with low latency requirements, while Wi-Fi can be prioritized for services that have a high bandwidth requirement. The SDN controller 510 can communicate the intelligent decisions cross service, core, backhaul and access network. The SDN controller 510 manages which radio devices the access slices have access to, and then the access slices manage the control and user plane and pass the slices to the slices in the core network.

The common slice can also include an intelligent resource management function 516 that can consider traffic load, access types (5G, 4G, 3G, Wi-Fi, etc.) and their signal strength which inline will decide traffic distribution cross available access types and Slices already instantiated or available in E-comp to be instantiated. IRM 516 can also decide the optimal physical (connection with transceivers) and functional (vNFs in slices) elements. IRM 516 also will play a deciding role on which transceivers will be used on what spectrum and how much power dedicated to the transceivers. The intelligent resource management function can keep a resource management log that includes medium access control, networking, management information, baseband and digital signal processing records. This information can be used in similar circumstances for a streamlined, efficient and intelligent management of the resources. As this log keep growing it makes the decision making process much more efficient by referring back to a similar circumstances and comparing the result and fine tuning the decision for an optimal result.

The slice selection function 512 can select an access slice from a pool of access slices to facilitate a service. The slice selection function 512 can determine which slice is appropriate based on the user equipment device 502, the type of service being requested, customer and/or subscriber account, and other information.

Figure 6:
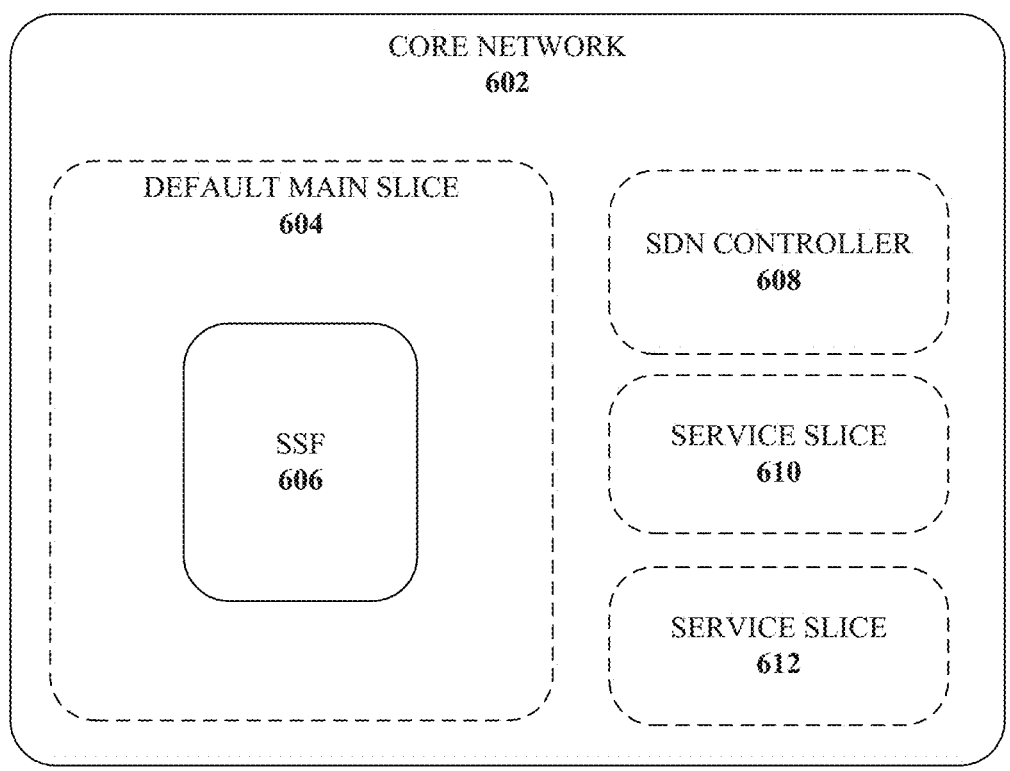
FIG. 6 illustrates an example embodiment of a core network in accordance with various aspects and embodiments of the subject disclosure.

Turning now to FIG. 6, illustrated is an example embodiment 600 of a core network 602 in accordance with various aspects and embodiments of the subject disclosure.

The core network can comprise a default main slice 604 with various network functions to manage communications received from the radio access network and assign the communications to one or more service slices 610 and 612 based on the service associated with the communications. The main slice can include a slice selection function 606 which determines which service slice should handle the service requested from the user equipment device, and the SDN controller 608 can manage which communications the service slices 610 and 612 have access to.

Figure 7:
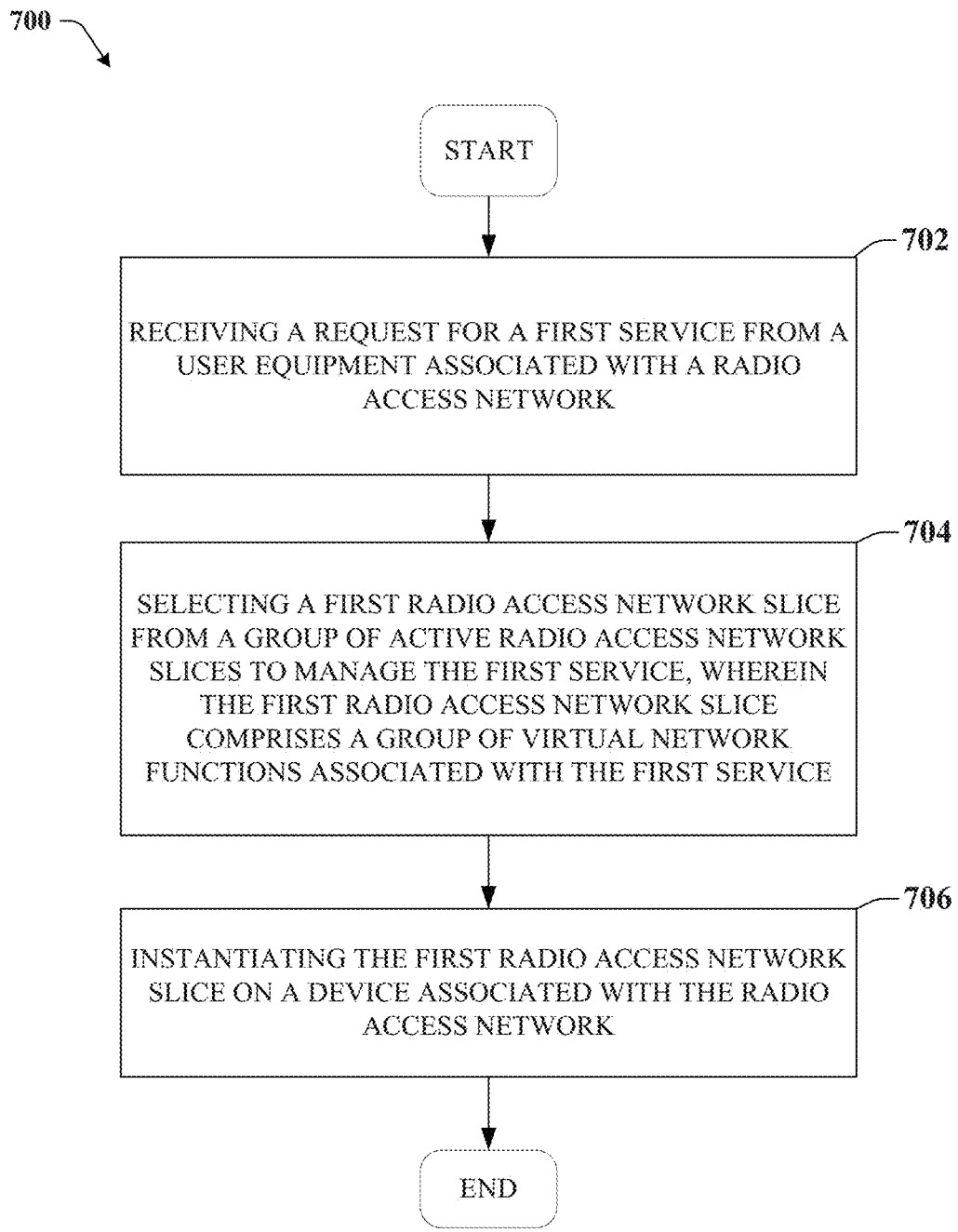
FIG. 7 illustrates an example method for dynamically providing access slice pooling in accordance with various aspects and embodiments of the subject disclosure.
Figure 8:
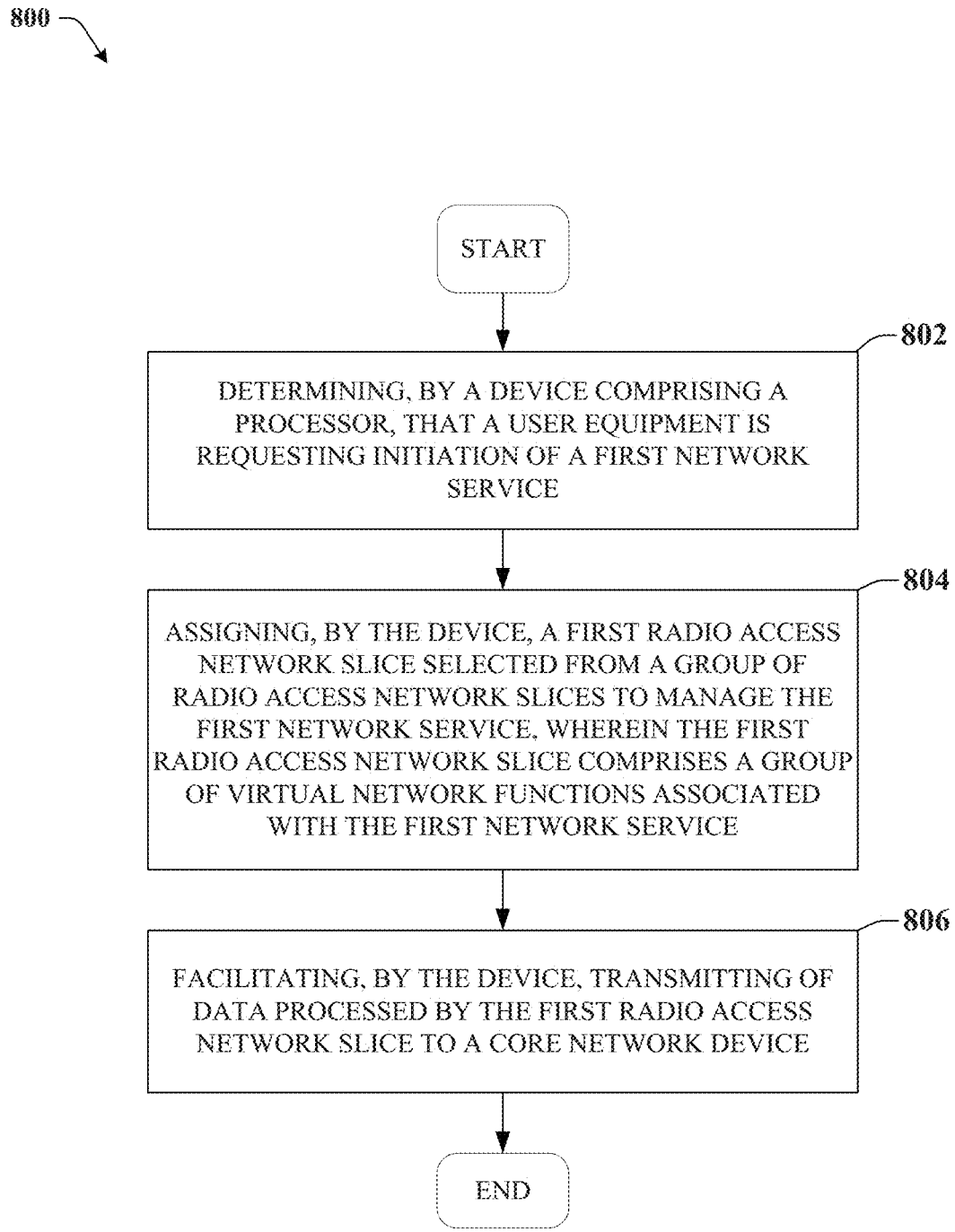
FIG. 8 illustrates an example method for dynamically providing access slice pooling in accordance with various aspects and embodiments of the subject disclosure.

FIGS. 7-8 illustrates processes in connection with the aforementioned systems. The process in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates an example method 700 for dynamically providing access slice pooling in accordance with various aspects and embodiments of the subject disclosure.

Method 700 can begin at 702 wherein the method includes receiving a request for a first service from a user equipment associated with a radio access network.

At 704, the method can include selecting a first radio access network slice from a group of active radio access network slices to manage the first service, wherein the first radio access network slice comprises a group of virtual network functions associated with the first service.

At 706, the method can include instantiating the first radio access network slice on a device associated with the radio access network.

FIG. 8 illustrates an example method 800 for dynamically providing access slice pooling in accordance with various aspects and embodiments of the subject disclosure.

Method 800 can begin at 802 wherein the method includes determining, by a device comprising a processor, that a user equipment is requesting initiation of a first network service.

At 804, the method can include assigning, by the device, a first radio access network slice selected from a group of radio access network slices to manage the first network service, wherein the first radio access network slice comprises a group of virtual network functions associated with the first network service.

At 806, the method can include facilitating, by the device, transmitting of data processed by the first radio access network slice to a core network device.

Figure 9:
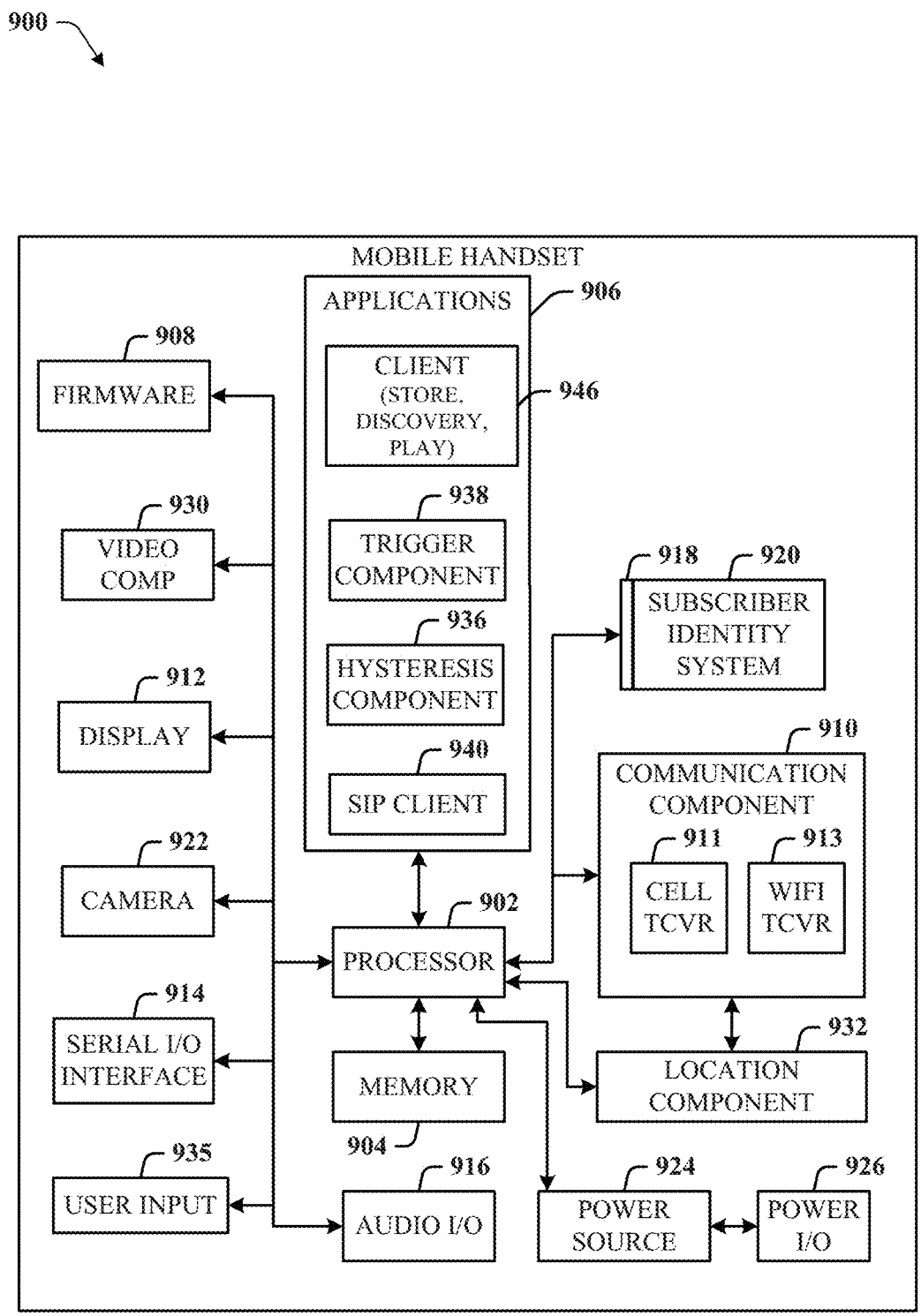
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
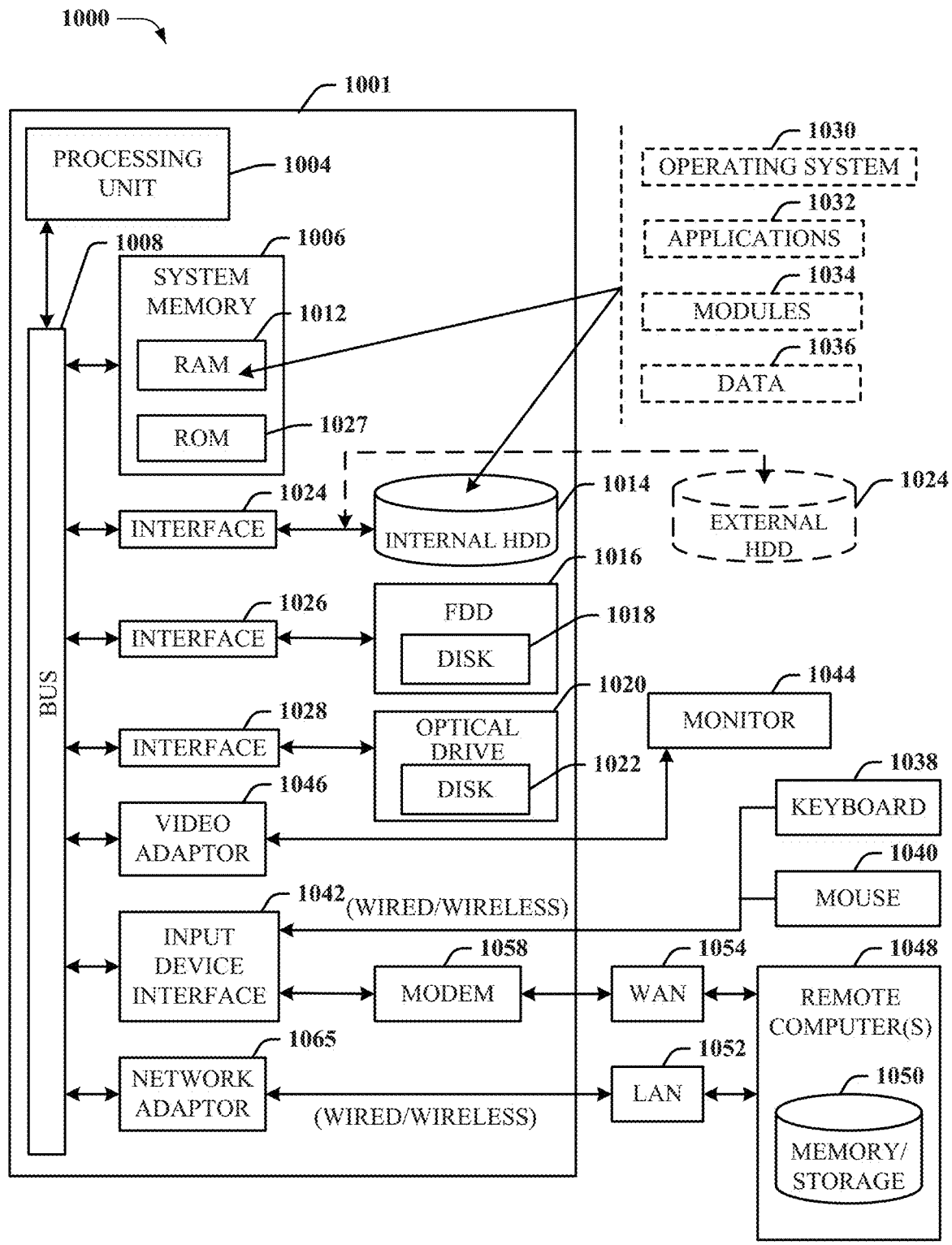
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   identifying, by a device comprising a processor, a radio access network slice associated with a radio access network, wherein the radio access network slice comprises a virtual network function; and
   based on an indication associated with the virtual network function, prioritizing, by the device, access to the radio access network via the radio access network slice.

2. The method of claim 1, wherein the indication indicates that the virtual network function is associated with a service, and wherein the prioritizing is based on a characteristic of the service.

3. The method of claim 2, wherein the characteristic is an implication, of the service, of a service level of a resource associated with the virtual network function, and wherein the prioritizing is based on the service level.

4. The method of claim 3, wherein the resource enables a reduction in latency of services provided by the virtual network function.

5. The method of claim 3, wherein the resource enables an increase in bandwidth of communications used for provision of the virtual network function.

6. The method of claim 1, wherein the radio access network slice was instantiated via a user equipment, wherein the indication indicates a characteristic of the user equipment related to the virtual network function, and wherein the prioritizing is based on the characteristic of the user equipment.

7. The method of claim 6, wherein the characteristic of the user equipment comprises the characteristic of a service contract associated with the user equipment that implicates a service level of a resource to be provided in connection with the virtual network function.

8. The method of claim 6, wherein the characteristic of the user equipment comprises a communications capability of the user equipment according to a fifth generation (5G) network communications protocol.

9. A system, comprising:
   a processor; and
   a memory that stores executable instructions that, when executed by the processor, facilitate performance of operations, comprising:
      requesting, from a device via a network, a provision of a service associated with a virtual network function enabled via the network,
      based on the requesting, instantiating a network slice associated with the virtual network function, wherein the network slice was allocated by the device to the system, and
      utilizing the service with a priority of use of the virtual network function based on the priority granted by the device based on a first characteristic of the service.

10. The system of claim 9, wherein the first characteristic of the service comprises an implication, of the service, of a service level of a resource associated with the virtual network function, and wherein the prioritizing is based on the service level.

11. The system of claim 10, wherein the resource comprises a latency of services resource provided by the virtual network function to the system.

12. The system of claim 10, wherein the resource comprises a bandwidth of communications resource for provision of the virtual network function to the system.

13. The system of claim 9, wherein the first characteristic of the service is determined based on a relation between operation of the service and a service level agreement of the system.

14. The system of claim 9, wherein the network slice was instantiated by a user equipment, wherein the indication comprises an indication of a second characteristic of the user equipment related to the virtual network function, and wherein the prioritizing is based on the second characteristic of the user equipment.

15. The system of claim 14, wherein the second characteristic of the user equipment comprises a characteristic of a service contract associated with the user equipment that implicates a service level for provision of the virtual network function.

16. The system of claim 14, wherein the second characteristic of the user equipment comprises a communication capability of the user equipment.

17. The system of claim 9, wherein the network comprises a radio access network.

18. A non-transitory machine-readable medium, comprising executable instructions that, when executed by a processor, facilitate performance of operations, comprising:
   identifying a radio access network slice associated with a radio access network, wherein the radio access network slice comprises a virtual network function; and
   prioritizing, based on an indication associated with the virtual network function, access to the radio access network via the radio access network slice.

19. The non-transitory machine-readable medium of claim 18, wherein the indication comprises an indication that the virtual network function is associated with a service, and wherein the prioritizing is based on a characteristic of the service.

20. The non-transitory machine-readable medium of claim 19, wherein the characteristic is determined to implicate, for the service, a service level of a resource associated with the virtual network function, and wherein the prioritizing is based on the service level.

* * * * *